(12) United States Patent
MacLean et al.

(10) Patent No.: US 12,461,934 B2
(45) Date of Patent: Nov. 4, 2025

(54) GENERATION AND GRAPHICAL DISPLAY OF DATA TRANSFORM PROVENANCE METADATA

(71) Applicant: Palantir Technologies Inc., Denver, CO (US)

(72) Inventors: Matthew MacLean, New York, NY (US); Adam Borochoff, New York, NY (US); Jared Newman, Costa Mesa, CA (US); Joseph Rafidi, Mountain View, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/886,717

(22) Filed: Sep. 16, 2024

(65) Prior Publication Data

US 2025/0086196 A1 Mar. 13, 2025

Related U.S. Application Data

(63) Continuation of application No. 18/465,089, filed on Sep. 11, 2023, now Pat. No. 12,093,279, which is a
(Continued)

(51) Int. Cl.
*G06F 16/26* (2019.01)
*G06F 16/21* (2019.01)
(Continued)

(52) U.S. Cl.
CPC ............ *G06F 16/26* (2019.01); *G06F 16/212* (2019.01); *G06F 16/221* (2019.01);
(Continued)

(58) Field of Classification Search
CPC ...... G06F 16/27; G06F 16/904; G06F 16/258; G06F 16/221; G06F 16/212; G06F 16/2282; G06F 16/26
See application file for complete search history.

(56) References Cited

U.S. PATENT DOCUMENTS

| 2007/0294266 A1 | 12/2007 | Chowdhary et al. |
| 2010/0070463 A1 | 3/2010 | Zhao et al. |

(Continued)

OTHER PUBLICATIONS

Raj et al., "Visualization Dimensions for High Performance Big Data Analytics", In: Wireless Sensors in Heterogeneous Networked Systems, dated Oct. 17, 2015, pp. 339-365.
(Continued)

*Primary Examiner* — Etienne P Leroux
(74) *Attorney, Agent, or Firm* — Duane Morris LLP

(57) ABSTRACT

A method of determining and displaying metadata that represents provenance of columns in a data store comprises receiving query data expressed in a human-readable language and describing one or more transformations of data tables of a distributed database system or columns of the data tables; parsing the query data to create a data structure for unresolved transforms in which the data tables are not matched with the columns; based in part upon table schema metadata describing the columns of the data tables, creating an additional data structure for resolved transforms, the additional data structure matching the data tables with the columns and specifying inputs and outputs of each transformation of the one or more transformations; based on information in the additional data structure, creating and causing display of a visual graph of the columns of the data tables and relationships between the columns, relating to the one or more transformations.

20 Claims, 8 Drawing Sheets

Related U.S. Application Data continuation of application No. 17/727,578, filed on Apr. 22, 2022, now Pat. No. 11,755,614, which is a continuation of application No. 16/014,005, filed on Jun. 21, 2018, now Pat. No. 11,314,769.

(60) Provisional application No. 62/523,720, filed on Jun. 22, 2017.

(51) Int. Cl.
  *G06F 16/22* (2019.01)
  *G06F 16/25* (2019.01)
  *G06F 16/27* (2019.01)

(52) U.S. Cl.
  CPC ........ *G06F 16/2282* (2019.01); *G06F 16/258* (2019.01); *G06F 16/27* (2019.01)

(56) References Cited

U.S. PATENT DOCUMENTS

| | | | |
|---|---|---|---|
| 2016/0048542 A1 | 2/2016 | Kshetri et al. | |
| 2016/0117375 A1* | 4/2016 | Antonopoulos | G06F 16/219 707/638 |
| 2017/0090893 A1 | 3/2017 | Aditya et al. | |
| 2017/0141797 A1 | 5/2017 | Scholl et al. | |
| 2018/0260287 A1 | 9/2018 | Iyer et al. | |
| 2020/0026790 A1 | 1/2020 | Maclean et al. | |

OTHER PUBLICATIONS

European Patent Office, "Search Report" in application No. 18179100.5-1217, dated Oct. 9, 2018, 16 pages.
European Patent Office, "Search Report" in application No. 18179100.5-1217 dated Aug. 13, 2018, 17 pages.
European Claims in application No. 18179100.5-1217, dated Oct. 2018, 2 pages.
European Claims in application No. 18179100.5-1217, dated Aug. 2018, 3 pages.
Brimhall, Jason, et al., "Stored Procedures" In: "SQL Server 2012 T-SQL Recipes: A Problem-Solution Approach", dated Sep. 11, 2012, Apress, pp. 363-382.
Ashish Thusoo et al., "Hive—A Petabyte Scale Data Warehouse Using Hadoop", Data Engineering ICDE dated 2010, IEEE 26th International Conference on, IEEE, dated Mar. 1, 2010, pp. 996-1005.

* cited by examiner

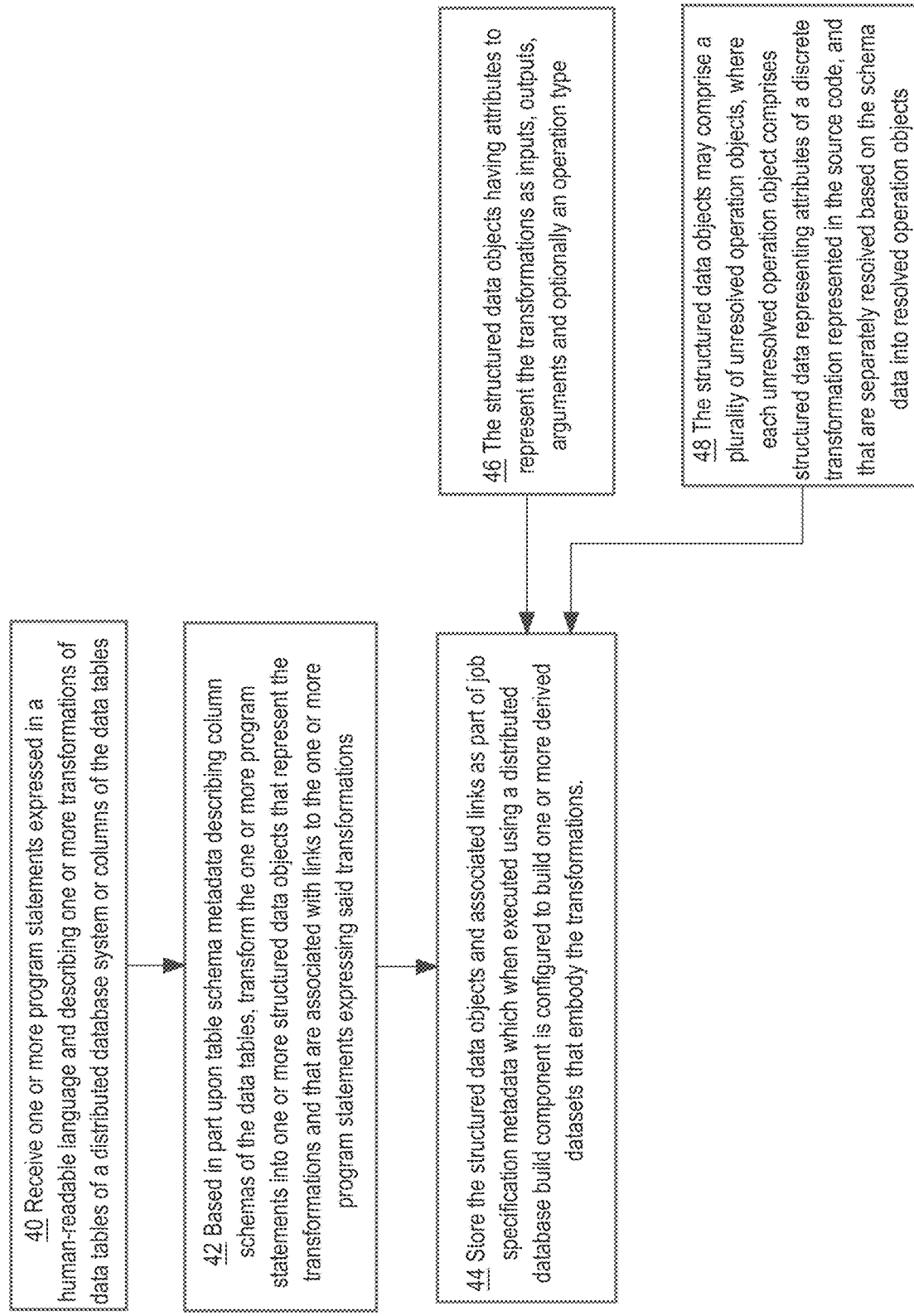

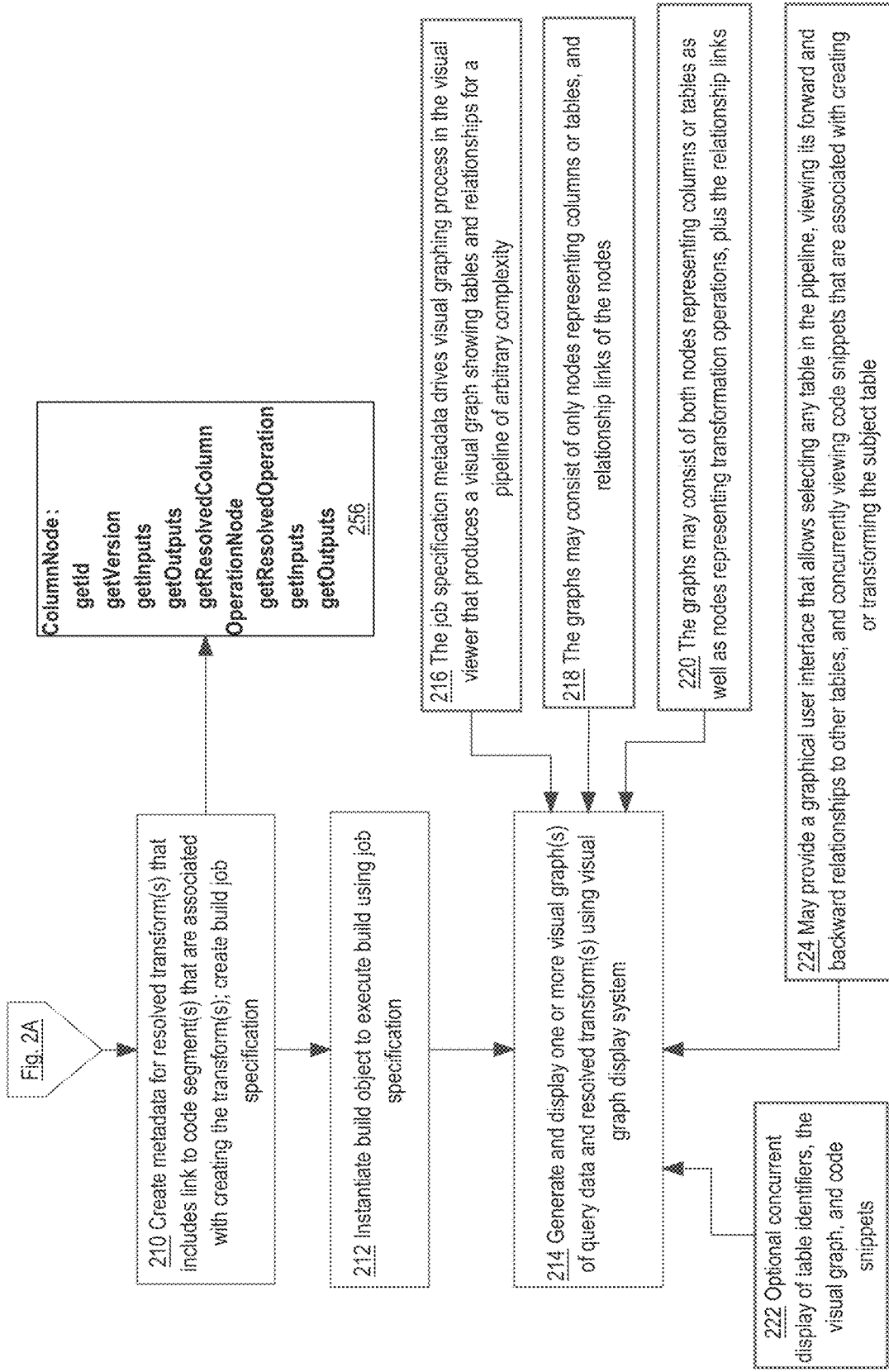

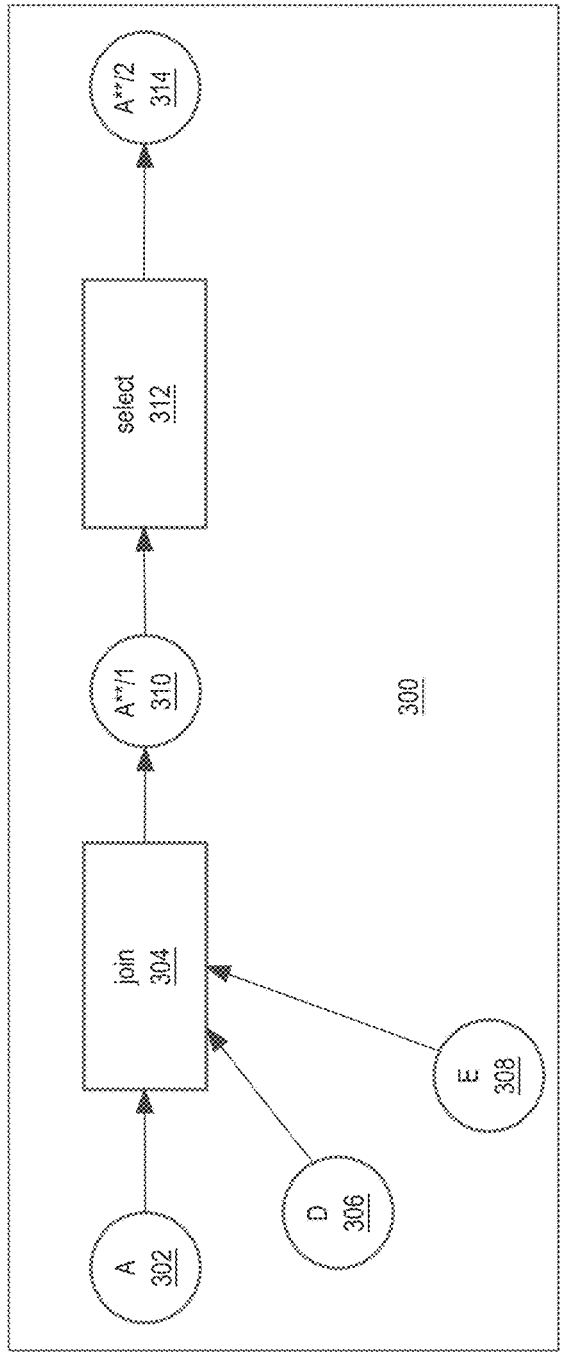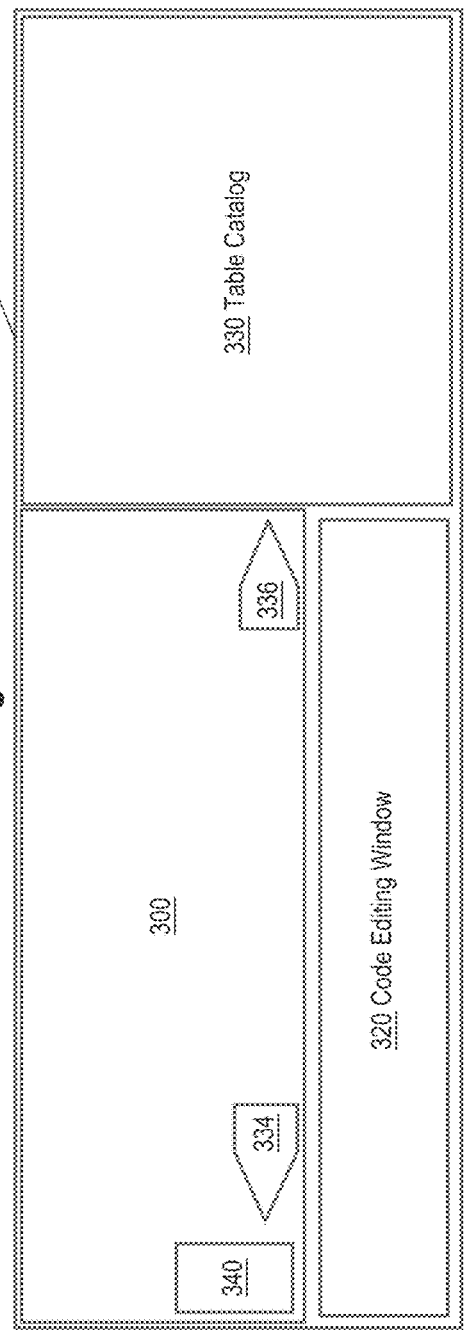

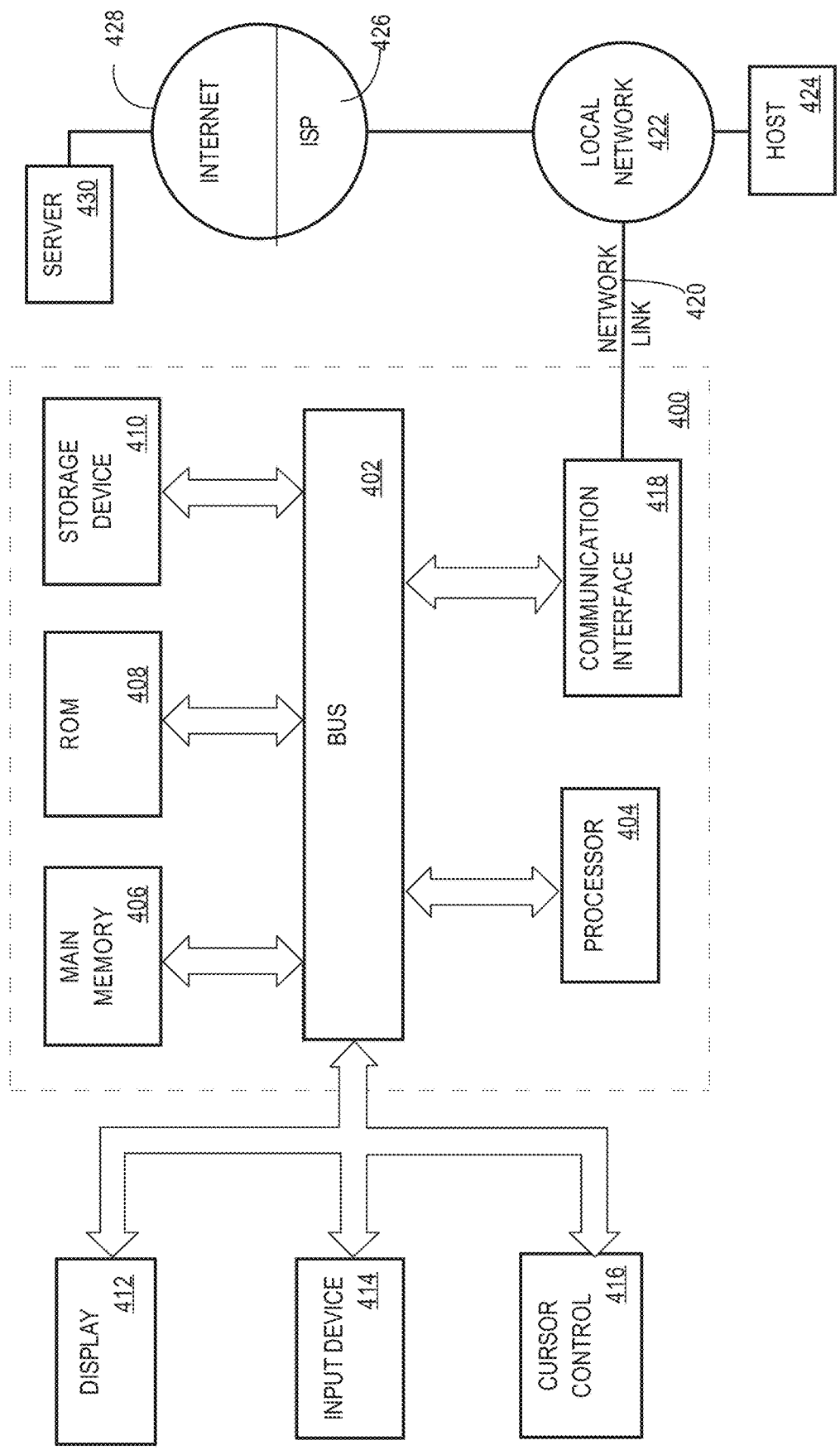

GENERATION AND GRAPHICAL DISPLAY OF DATA TRANSFORM PROVENANCE METADATA

BENEFIT CLAIM

This application claims the benefit under 35 U.S.C. 120 as a Continuation of U.S. patent application Ser. No. 18/465,089, filed on Sep. 11, 2023, which is a Continuation of U.S. patent application Ser. No. 17/727,578, filed on Apr. 22, 2022, now U.S. Pat. No. 11,755,614, issued on Sep. 12, 2023, which is a Continuation of U.S. patent application Ser. No. 16/014,005, filed on Jun. 21, 2018, now U.S. Pat. No. 11,314,769, issued on Apr. 26, 2022, which claims the benefit under 35 U.S.C. 119 (e) of U.S. Provisional Patent Application No. 62/523,720, filed on Jun. 22, 2017, the entire contents of which are hereby incorporated by reference as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present disclosure relates to computer-implemented distributed database systems. More specifically, the example embodiment(s) described below relate to computer-implemented techniques for calculating or determining, and then visualizing if needed, metadata that specifies the provenance of individual columns in a columnar datastore or relational database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Distributed database systems are now available that implement data pipelines capable of executing serial or serial-parallel transformations on data tables. Source code development languages are available for expressing table schemas, transformations and other functional operations on rows or columns in the form of natural language code that can be transformed and committed in an executable form such as a SQL query.

However, as the source code, schemas, tables and transformations become complex, it is difficult to determine, when viewing a particular table or column at an arbitrary point in time, how errors have arisen or what effects could occur if transformations are changed. It can be useful to track backwards through time the joins, selections or other transformations that caused a particular column to exist or achieve a specified state. There is no practical way to visually trace the datasets or operations that have contributed to creating a particular column of a particular table in a complex pipeline. Programs, or data analysts, may have a need to know what data transformation is responsible for creating, deleting or updating a particular column of a particular dataset. Another common problem is that columns usually only have the column name as a description, which is insufficient, and manual commenting is prone to falling out of date.

Determining or calculating data values that show how a particular column reached a particular present state are not readily available in current technology. Thus, there is a need for a computer system and computer programs that are capable of calculating or determining provenance metadata for one or more columns of a dataset, and for visually displaying a representation of the metadata.

SUMMARY

The appended claims may serve to summarize the disclosure.

BRIEF DESCRIPTION OF THE DRAWINGS

In the drawings:

FIG. 1B illustrates a process of determining metadata that represents provenance of columns in a data store.

FIG. 2B illustrates a portion of an algorithm or process of determining metadata that represents provenance of columns in a data store.

FIG. 3A illustrates an example graphical visualization, which may be programmed for display using a computer display device, showing provenance of columns of a data store.

FIG. 3B illustrates an example graphical user interface with which embodiments may be implemented.

FIG. 4 is a block diagram that illustrates a computer system upon which an embodiment may be implemented.

DETAILED DESCRIPTION

Figure 1A:
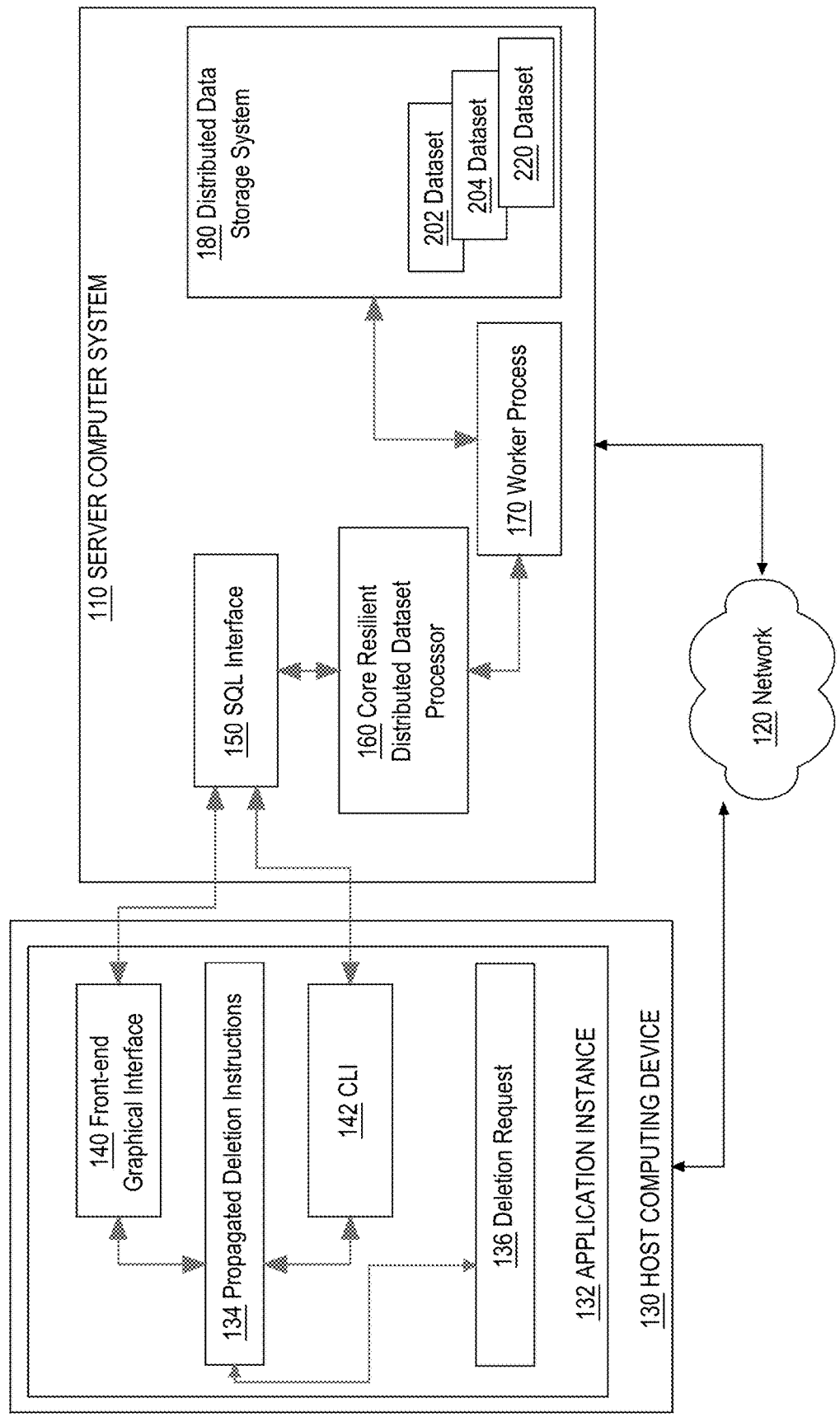
FIG. 1A illustrates a distributed computing system with which embodiments may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
GENERAL OVERVIEW
DISTRIBUTED DATABASE SYSTEM OVERVIEW
EXAMPLE PROCESS OF DETERMINING METADATA OF COLUMN PROVENANCE
IMPLEMENTATION EXAMPLE—HARDWARE OVERVIEW
IMPLEMENTATION EXAMPLE—BASIC SOFTWARE SYSTEM
EXTENSIONS AND ALTERNATIVES

General Overview

Techniques for dynamically generating metadata describing transformations of data tables is provided, with techniques for rendering the metadata as a visual graph that shows transformational relationships of tables including upstream tables that contributed to columns in a particular table and downstream tables to which the same particular table contributes. Source code in a human-readable language, describing transformations to tables, is prepared using a text-based editor program. Complete source code may be persistently stored or "committed" to a distributed database system that includes a compiler or parser, a dataset builder and a visual viewer. The commit operation may trigger a parsing or compilation operation in which the compiler or parser transforms the source code into a plurality of unresolved operation objects, where each unresolved operation object comprises structured data representing attributes of a discrete transformation represented in the source code. Additionally or alternatively, the process may be executed in response to a user writing code, but before committing the code, to test logic of the code to identify what effects could occur if transformations are changed; a code development environment could provide a selectable link, button or other user interface widget to act as a manual means of starting such testing. Each unresolved operation object also has a link to a snippet of the source code that is associated with creating or performing the operation. The parser or compiler then obtains table schema data for tables referenced in the source code and transforms the unresolved operation objects into resolved operation objects that specify inputs, outputs and arguments of the transformations, with transformation type values if appropriate. The code links are maintained with the resolved operation objects. The resolved operation objects may be stored with job specification metadata that drives dataset build operations in the distributed database system to use the transformations to actually transform source tables into derived datasets. The job specification metadata also may drive a visual graphing process in the visual viewer that produces a visual graph showing tables and relationships for a pipeline of arbitrary complexity. Consequently, with the visual viewer it is possible to select any table in the pipeline, view its forward and backward relationships to other tables, and concurrently view code snippets that are associated with creating or transforming the subject table.

In one embodiment, a data processing method comprises receiving one or more program statements expressed in a human-readable language and describing one or more transformations of data tables of a distributed database system or columns of the data tables; based in part upon table schema metadata describing column schemas of the data tables, transforming the one or more program statements into one or more structured data objects that represent the transformations and that are associated with links to the one or more program statements expressing said transformations; storing the structured data objects and associated links as part of job specification metadata which when executed using a distributed database build component is configured to build one or more derived datasets that embody the transformations.

In one feature, the structured data objects having attributes to represent the transformations as inputs, outputs, arguments and optionally an operation type. The structured data objects may comprise a plurality of unresolved operation objects, where each unresolved operation object comprises structured data representing attributes of a discrete transformation represented in the source code, and that are separately resolved based on the schema data into resolved operation objects.

In one feature, the source code may consist of a series of SQL statements or queries.

In a further feature, the job specification metadata drives a visual graphing process in the visual viewer that produces a visual graph showing tables and relationships for a pipeline of arbitrary complexity. Graph, for example, may consist of only nodes representing columns or tables, and relationship links of the nodes. Or, graphs consist of both nodes representing columns or tables as well as nodes representing transformation operations, plus the relationship links. The visualization sub system may provide concurrent display of table identifiers, the visual graph, and code snippets. Embodiments may be programmed for managing a graphical user interface that allows selecting any table in the pipeline, viewing its forward and backward relationships to other tables, and concurrently viewing code snippets that are associated with creating or transforming the subject table.

Other embodiments, aspects and features will become apparent from the disclosure as a whole including the following description, the drawings and the claims.

Distributed Database System Overview

FIG. 1A illustrates a distributed computing system with which embodiments may be implemented.

In an embodiment, a distributed computing system comprises a server computer ("server") 110 that is coupled via network 120 to a host computing device 130. The distributed computing system can be within one or more data centers, virtual computing facilities or other hosting facilities; other embodiments can be within a networked home, office, or campus.

Network 120 broadly represents a combination of one or more local area networks, wide area networks and internetworks and may include the public internet. The network 120 can connect one or more instances of the host 130 and server 110 together within the distributed computing environment. Network 120 can be composed of multiple sub-networks that are coupled. For example, the network 120 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as computing device 400 that is described below with respect to FIG. 4. Alternatively, a host can be a single virtual computer instance that executes on a computing device facilitated by a virtualization layer (e.g., a Type 1 or Type 2 hypervisor) interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system (e.g., UNIX, LINUX, MACOS, WINDOWS) as illustrated, for example, by operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g., the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises column provenance instructions 134, a front-end graphical interface 140 and a command-line interface (CLI) 142 that may interoperate to provide the functions that are described further herein. In some embodiments, column provenance instructions 134 may be integrated into the distributed data storage system 180 or executed as a service or application on server 110 and coupled to the distributed data storage system 180, interacting with the application instance 132 using CLI 142, programmatic calls, remote procedure calls (RPC) or HTTP. In an embodiment, the front-end interface 140 and CLI 142 are programmed or configured to interact with one or more server-side functional units of server computer 110 as further described. Host computing device 130 also manages one or more inspection requests 136, relating to determining or visualizing column provenance or foundation metadata, using processes that are further described in other sections. In an embodiment, either the front-end interface or the CLI can be used to input SQL queries, statements or transforms to SQL interface 150, or to make inspection requests 136 to the column provenance instructions 134, optionally to cause displaying a graphical display of column provenance relationships using a computer display device.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises an SQL interface 150, a core resilient distributed dataset (RDD) processor 160, one or more worker processes 170, and a distributed data storage system 180 that stores, for example, datasets 202, 204, 220 as further described. In an embodiment, SQL interface 150 is programmed or configured to receive electronic digital messages that define database operations according to a structured query language, parse the messages to determine the operations, and instruct the core RDD processor 160 to execute the operations. Typically execution of the operations causes instructing one or more worker processes 170 to execute builds of derived datasets, based on raw datasets, with distributed data storage system 180. In one implementation, SQL interface 150 comprises an executable instance of SPARK SQL; the core RDD processor 160 is an executable instance of the SPARK Core; and distributed database system 180 may be an executable instance of a HADOOP file system or a hierarchical distributed database server that implements object immutability.

In general, SQL interface 150 provides a flexible and efficient way to indirectly specify rows in a database to be acted upon, with the security of not explicitly transmitting row identifiers across a network connection, but its use is optional and other ways of specifying or identifying rows could be used in other embodiments. For example, as an alternative to an SQL query, a set of explicit row identifiers may be cryptographically hashed using SHA-256 or another hash algorithm and the resulting hash strings may be transmitted in a request to the processor 160. The processor 160 then may command worker process 170 to compare the hash string values to an index of previously prepared hash string values of rows of datasets in the distributed data storage system 180, and then delete rows where a hash match is found. Both the SQL approach and hash approach have the benefit of avoiding transmission of an explicit row identifier, which could be recorded in a log file or otherwise stored in an unanticipated manner.

In an embodiment, each of the propagated deletion instructions 116, SQL interface 150, core RDD processor 160, worker process 170, and distributed data storage system 180 comprises a set of one or more pages of main memory, such as RAM, in the host computer 130 or server 110 into which executable instructions have been loaded and which when executed cause each respective computer to perform the functions or operations that are described herein with reference to those functional units. For example, the propagated deletion instructions 116 may comprise a set of pages in RAM that contain instructions which when executed cause performing the hard delete functions that are further described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of the aforementioned instructions also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. The specific manner in which programmers or software developers organize and arrange source code for later compilation into an executable, or interpretation into bytecode or the equivalent, for execution by the server 110 or host computing device 130, is not critical.

Example Process of Determining and Visualizing Column Provenance Metadata

Figure 1C:
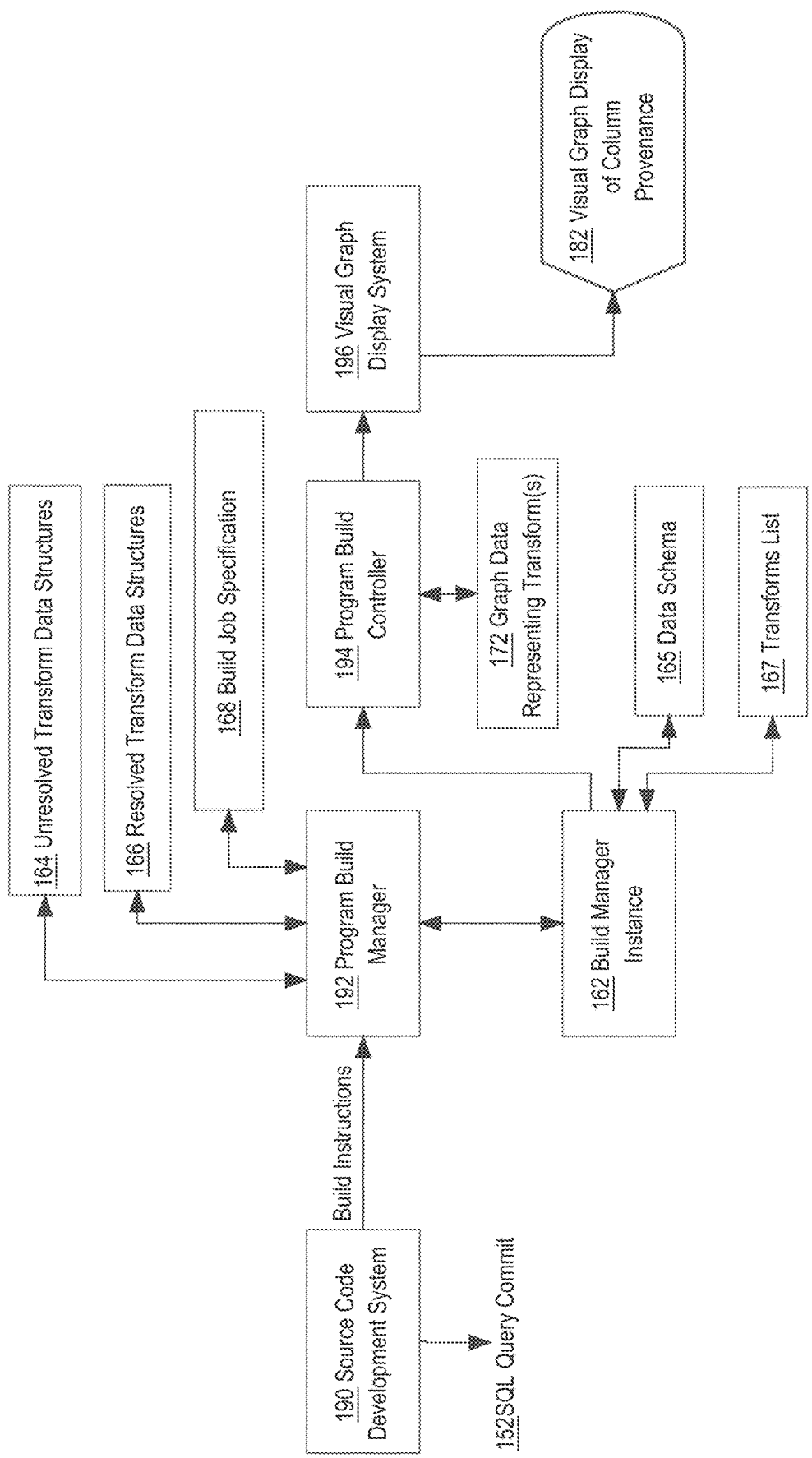
FIG. 1C illustrates a data flow and programmatic components that may be used in a process of determining metadata that represents provenance of columns in a data store.
Figure 2A:
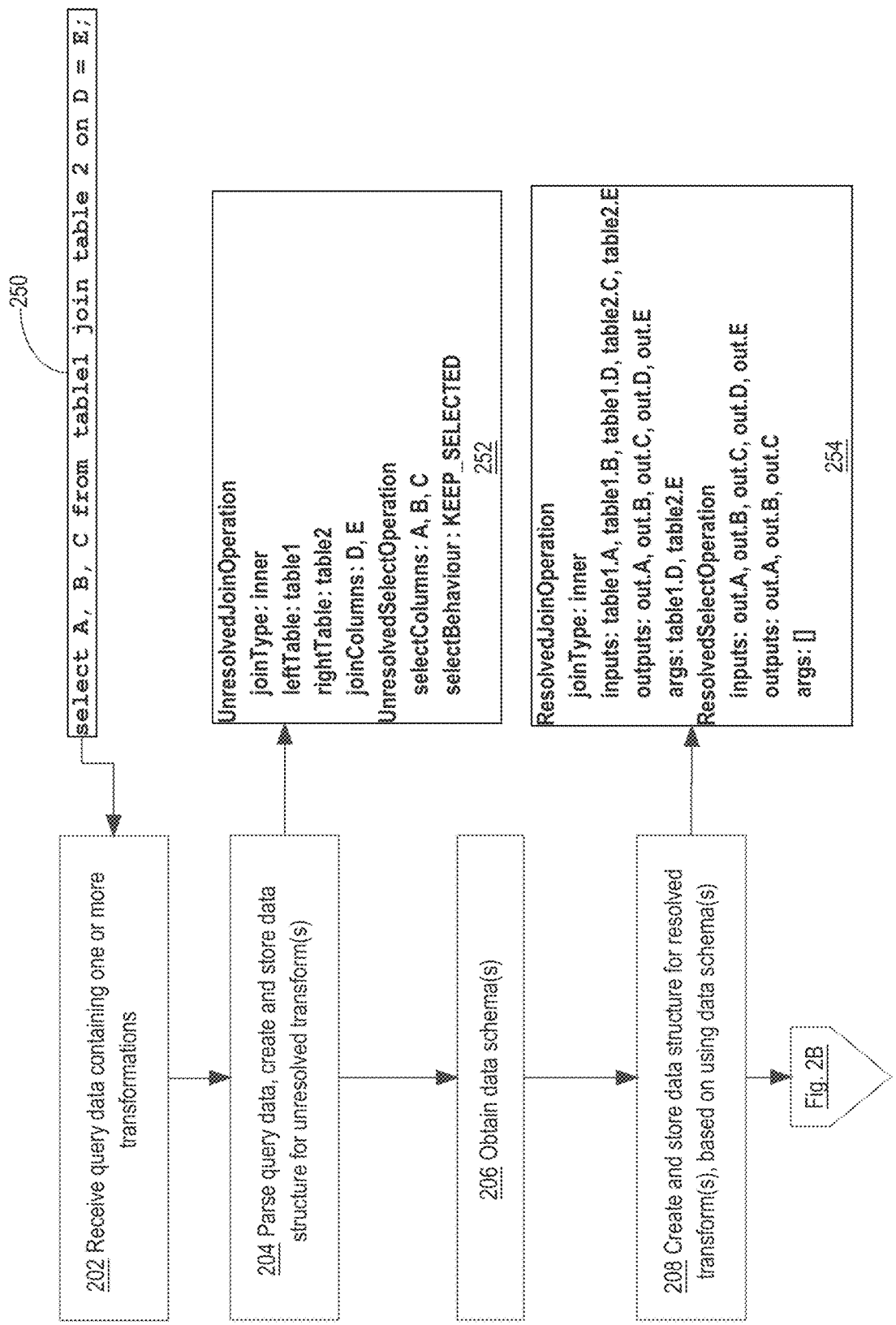
FIG. 2A illustrates a portion of an algorithm or process of determining metadata that represents provenance of columns in a data store.

FIG. 1B illustrates a process of determining metadata that represents provenance of columns in a data store. FIG. 1C illustrates a data flow and programmatic components that may be used in a process of determining metadata that represents provenance of columns in a data store. FIG. 2A illustrates a portion of an algorithm or process of determining metadata that represents provenance of columns in a data store. FIG. 2B illustrates a portion of an algorithm or process of determining metadata that represents provenance of columns in a data store. FIG. 3A illustrates an example graphical visualization, which may be programmed for display using a computer display device, showing provenance of columns of a data store.

Each of FIG. 1B, FIG. 1C, FIG. 2A and FIG. 2B and any other flow or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

Referring first to FIG. 1B, in an embodiment, a program or software element such as column provenance instructions 134 may be programmed to execute a process of determining metadata describing a provenance of data tables or columns based on inspection of a symbolic query or statement and a data schema. At operation 40, the process receives one or more program statements that are expressed in a human-readable language and describing one or more transformations of data tables of a distributed database system or columns of the data tables. For example, an SQL statement may be processed, as described further herein in other sections.

A digitally stored data schema also supports calculation of column provenance metadata. At operation 42, based in part upon table schema metadata describing column schemas of the data tables, the process transforms the one or more program statements into one or more structured data objects that represent the transformations and that are associated with links to the one or more program statements expressing said transformations.

At operation 44, the process is programmed to store the structured data objects and associated links as part of job specification metadata which, when executed using a distributed build component, is configured to build one or more derived datasets that embody the transformations.

As indicated by block 46, in an embodiment, the structured data objects may have attributes to represent the transformations as inputs, outputs, arguments and optionally an operation type.

Further, as seen in block 48, in an embodiment, the structured data objects may comprise a plurality of unresolved operation objects, where each unresolved operation object comprises structured data representing attributes of a discrete transformation that is represented in the source code or program statements, and that are separately resolved based on the schema data into resolved operation objects. "Object," in this context, refers to programmatic objects that can be managed in electronic digital computer memory and created, read, updated or deleted under program control.

FIG. 1C, FIG. 2A, FIG. 2B and FIG. 3A present further details of an example implementation of the process that has been broadly described with reference FIG. 1B. Turning first to FIG. 1C, some embodiments may be implemented in the context of a data pipeline development system that includes a source code development system 190 coupled to a program build manager 192, which can instantiate one or more build manager instances 162 that are coupled to program build controller 170, which in turn can drive a visual graph display system 196 to produce a visual graph display of column provenance 182. In one embodiment, all the foregoing elements of FIG. 1C are hosted or executed by host computing device 130; in some embodiments, one or more elements may be hosted or executed by server 110 as the context of this disclosure may indicate.

In an embodiment, source code development system 190 is configured to support input, editing and committing to build dataset transformations using a text editor and other programming tools that may be accessed using a graphical user interface such as via front end interface 140 (FIG. 1A). In one embodiment, in the source code development system 190, transformations are expressed in human-readable symbolic statements. Examples of statements include but are not limited to structured query language (SQL) statements or queries or other programmatic statements. Build plans, which some build systems generate from code and are used to execute the build, also can be processed to generate column provenance information. This approach may be useful with a system like Spark; instead of translating a variety of languages into column provenance operations, Spark will convert all languages into its own query plan language, and then the process described in this disclosure can be programmed to translate just that language into column provenance operations. These statements and queries can be part of a larger program written in human-readable source code that is capable of compilation and execution in coordination with the distributed database storage system 180 of FIG. 1A.

When a particular SQL query is completed and believed to be accurate, it can be committed to persistent storage and concurrently made available to a pipelined distributed database system as indicated by SQL query commit 152. Signaling a query commit can occur via input from host computer 130 using a widget or command of the front end interface 140 or CLI 142.

In response to a query commit operation, source code development system 190 transmits a set of build instructions to the program build manager 192. The build instructions in effect instruct the program build manager 192 to compile the program including the SQL query and add the program and query to the distributed database system 180 so that it becomes part of one or more data pipelines or otherwise available for use by data analysts or other users of that system.

In an embodiment, program build manager 162 instantiates a build manager instance 162 for purposes of managing the build in response to the build instructions for the SQL query commit 152. There may be any number of build instances 162, which provides flexibility by permitting parallel execution of any number of build instructions for different commits. In the course of executing, the build manager instance 162 creates and stores in memory, independently or with coordination through program build manager 192, unresolved transform data structures 164 to represent the committed SQL query and its attributes. Build manager instance 162 obtains a data schema 165 describing the structure and relationships of one or more tables that are referenced in the committed SQL query, applies the schema to the unresolved transform data structures 164 and creates and stores resolved transform data structures 166 in memory as a result. The resolved transform data structures 166 also represent the committed SQL query and its attributes, after resolution in view of the schema 165. Examples of these structures are described further in other sections of this disclosure.

One or more of the unresolved transform data structures 164 and the resolved transform data structures 166 may include a link or reference to the specific module of the source code developed using development system 190 that contains a definition of the committed SQL query; as a result, the system creates, stores and captures metadata that specifically ties a column transform or table transform to a segment of program source that is responsible for causing that transform. Further, the build manager instance 162 creates a build job specification 168 that contains build instructions in a format and syntax that the program build controller 194 is capable of consuming, and a transforms list 167 that identifies all transforms that occur in the committed SQL query. The use of a build job specification 168 is optional and particular to one embodiment; other embodiments may use only graph data 172 to collect metadata that is capable of driving a visual display of transforms, as further described.

Next, build manager instance 162 instructs the program build controller 194 to perform a build based upon the resolved transform data structures 166, the build job specification 168 and the transforms list 167. Program build controller 194 is programmed to perform two main functions, which may be performed in any order in various embodiments. First, the program build controller 194 is programmed to build an executable code module from the source code that has been developed using development system 190 and to link, add or otherwise introduce that executable to the distributed database system 180. Second, the program build controller 194 is programmed to create and store, in memory and/or persistent storage, graph data 172 representing the transforms that are represented in the resolved transform data structures 166.

At any time after completion of these programmed operations, the visual graph display system 196 may be invoked, and in response, the visual graph display system is programmed to read or load the graph data 172 and to create and cause displaying a graphical visual representation of the transforms. Therefore, provenance metadata for the committed SQL query and the tables and columns to which it relates are visually presented as the visual graph display 182. FIG. 3A illustrates an example of a visual presentation of provenance metadata and is discussed further in other sections.

FIG. 2A, FIG. 2B are now described to provide further detail of an example implementation of the operations that have been generally described with reference to FIG. 1C.

At block 202, the process of FIG. 2A receives query data containing one or more transformations. Block 250 illustrates an example query that could be received, in the form "select A, B, C from table1 join table2 on D=E;". This query is expressed in convention SQL and the reader of this disclosure is presumed to be experienced in writing and working with queries of this type so the specific meaning of the example query 250 will not be detailed as it is not necessary for a person of skill in the field to which this disclosure applies.

At block 204, the process parses the query data and creates and stores data structures for unresolved transforms. The unresolved transform data structures 164 of FIG. 1C correspond to this operation. Example unresolved query data 252 is shown in FIG. 2A based upon the example query 250. The example unresolved query data 252 comprises a data structure having operation attributes that represent an unresolved join operation and an unresolved select operation, which were found in the example query 250 based on parsing the SELECT and JOIN operators. The unresolved join operation comprises sub attributes specifying a join type, left table, right table, and columns involved in the join. The unresolved select operation comprises sub attributes specifying columns involved in the selection and a behavior characteristic. Thus, different operations that are recognized in the committed query, based on the parsing, may result in creating different sub attributes for those operations as appropriate. Furthermore, while unresolved query data 252 illustrates only two operations for purposes of showing a clear example, the unresolved query data may have any amount of complexity based upon the content of the corresponding query such as that of block 250.

At operation 206, the process obtains one or more data schemas applicable to the tables specified in the committed query. For the example query 250 of FIG. 2A, schemas for "table1" and "table2" would be obtained by calls or read operations directed to the distributed database system 180. That system is presumed to provide a catalog or other facility for creating, updating and reading schemas for datasets or database tables and that is capable of responding to requests or calls to retrieve a schema for a table, subject to access controls or other security requirements based on a role or identity of the host computing device 130.

At operation 208, the process creates and stores one or more data structures for resolved transforms, based on using the data schemas that were obtained at operation 206. An example resolved data structure is shown at block 254, corresponding to the example of block 250, 252 and comprises attributes to represent a resolved join operation and resolved select operation. The resolved join operation comprises sub attributes that specify a type, inputs in terms of specific table and column references, outputs and arguments with reference to a temporary table named "out" that may be created as part of processing the join operation in memory. The resolved select operation also specifies inputs and outputs with reference to the temporary table. Optionally arguments may be provided. Thus, different operations that are represented in the unresolved data structure of block 252, based on the data schema, may result in creating different sub attributes for those operations as appropriate in the resolved structure of block 254.

Referring now to FIG. 2B, in operation 210, the process creates metadata for the resolved transforms that includes a link to code segments that are associated with creating the transforms, and creates a build job specification. In an embodiment, operation 210 also comprises creating metadata that is structured to serve as a basis for visually rendering a graphical display of one or more columns or operations involved in a transform that was resolved. Block 256 shows an example of metadata in which a column and operation of a transform are represented by metadata such as an identifier, version, inputs, outputs and resolved column or operation.

At operation 212, the process instantiates a build operation to execute the build using the job specification. For example, build manager instance 162 may be instantiated at this operation and may operate as previously described for FIG. 1C.

At block 214, the process generates and displays one or more visual graphs of query data and resolved transforms using the visual graph display system, such as system 196 of FIG. 1C. As shown at block 216, the job specification and metadata such as block 256 may drive a visual graphing process in a visual viewer that produces a visual graph showing tables and relationships for a data pipeline of arbitrary complexity. FIG. 3A illustrates an example graphical visualization, which may be programmed for display using a computer display device, showing provenance of columns of a data store in one example embodiment. FIG. 3A also corresponds to the example that has been described for FIG. 2A, FIG. 2B.

In the example of FIG. 3A, a provenance graph 300 comprises nodes 302, 306, 308, corresponding to columns A, D, E, have edges connecting them to a join node 304 representing the join operation of the query shown at block 250 (FIG. 2A). The join node 304 has an edge connected to node 310 representing a join output column A, in version "1" as indicated by the designation "/1". Node 310 has an edge connected to a select node 312, which is connected by another edge to a column node 314 representing column A in version "2".

In another embodiment, the join node 304 and select node 312 may be omitted. Thus, as shown by block 218 (FIG. 2B), graphs may consist of only nodes representing columns or tables, and relationship links of the nodes. Or, as shown at block 220, the graphs may consist of both nodes representing columns or tables, as well as nodes representing transformation operations, plus relationship links, as seen in FIG. 3A.

With either embodiment, a graphical display of a data transform such as that of FIG. 3A provides a compact and efficient way to show how a particular column of a dataset or data table was produced. For example, with FIG. 3A, it is immediately apparent that column A**/2 is the result of a transformation of the columns represented by nodes 302, 306, 308, 310.

Optionally, as shown in block 222, the operation of block 214 can include concurrent display of table identifiers, the visual graph, and code snippets.

Furthermore, as shown by block 224, the process may be programmed to provide a graphical user interface that allows selecting any table in a data pipeline, viewing its forward and backward relationships to other tables, and concurrently viewing code snippets that are associated with creating or transforming the subject code.

FIG. 3B illustrates an example graphical user interface with which embodiments may be implemented. In the example of FIG. 3B, a computer display device 318 displays, under program control, a graphical user interface that includes a provenance graph 300 like that of FIG. 3A, as well as a code editing window 320 and a table catalog 330, all concurrently displayed within the same main window. The elements of FIG. 3B are not shown to scale and may be arranged using different sizes, positions and labels in other embodiments. Furthermore, for clarity, the details of FIG. 3A are not shown in FIG. 3B in the position of the provenance graph 300, but in a practical embodiment, the display of FIG. 3B would include all details of FIG. 3A at the position of the graph shown in FIG. 3B.

The table catalog 330 may be programmed as a window that provides a view of tables that have been defined as part of data schema 165, subject to access controls or security requirements that may limit what data a particular host computer 130 can view. In an embodiment, input from the host computing device 130 selects a particular table in the table catalog 330. In response, the provenance graph 300 of FIG. 3B is automatically updated to display a graphical representation of the provenance of all columns in the particular table that was selected.

In an embodiment, a GUI window showing the provenance graph 300 also may comprise a set of display controls 340 that can be programmed to cause zooming in, zooming out, or other functions. The graph 300 may be programmed to accept cursor controls, such as holding down a button and moving a pointing device, to cause translating the provenance graph leftward, rightward, up or down. A translation control also can be included among the controls 340 and selected on demand. A plurality of controls 340 may be provided in the form of selectable graphical icons formed to suggest a function, such as a [+] icon for selecting a zoom-in function.

Using controls 340, the host computing device 130 can cause redisplaying the graph 300 in a position of interest and at a particular level of detail. Typically this interaction is followed by selecting a particular node of the provenance graph 300. In response, source code associated with the selected particular node, and linked to that node via the metadata as previously described, is automatically retrieved and displayed in the code editing window 320. If another node of provenance graph 300 is later selected, then the code editing window 320 is automatically updated to by obtaining and displaying a copy of the code associated with that particular node.

In this manner, the interface of FIG. 3B is programmed to permit concurrent, efficient and rapid retrieval, display and analysis of relationships between datasets, tables, columns, their provenance in terms of sources and transformations leading to outputs, and the program code that is associated with causing any of the foregoing. The approach that has been described does not require the host computing device 130 to perform context switching or changes between different applications or window displays. Furthermore, less network bandwidth, CPU cycles and memory is consumed or used because fewer requests, responses or programmatic calls are needed in comparison to techniques that mandate the use of different windows or applications.

The code editing window 320 may be programmed to accept and respond to text editing operations as part of source code development system 150 (FIG. 1C) to create, modify or delete SQL queries and accept commands to perform SQL query commit 152. The code editing window 320 may display the contents of source code repository using a hierarchical tree display of folders, branches or other logical elements that identify or list tables, datasets or program files. In response to selecting a particular such elements, source code may be retrieved and displayed for viewing or editing.

In an embodiment, a GUI window showing the provenance graph 300 also may comprise a BACKWARD link 334 and FORWARD link 336, or similar widgets or icons which, when selected, cause updating a display such as FIG. 3A to show the provenance of columns before or after a particular transformation or set of transformations. For example, in response to input from host computer 130 selecting the BACKWARD link 334, the system or processes previously described may be programmed to obtain new graph data 172 relating to transforms earlier in the data pipeline represented in provenance graph 300, for example, transforms that resulted in creating columns A, D, E of nodes 302, 306, 308. Furthermore, the system or processes previously described may be programmed to update the provenance graph 300 based upon the new graph data 172 to show nodes and edges providing a graphical display of the earlier transforms. Updating the provenance graph 300 in this manner may include translating the existing graph laterally to the right and displaying new nodes and edges to the left of nodes 302, 306, 308 to illustrate the transforms or relationships that are arranged earlier in the pipeline.

Similarly, in response to input from host computer 130 selecting the FORWARD link 336, the system or processes previously described may be programmed to obtain new graph data 172 relating to transforms later in the data pipeline represented in provenance graph 300, for example, transforms that resulted in using column A**/2 of node 314 in downstream transformations. Furthermore, the system or processes previously described may be programmed to update the provenance graph 300 based upon the new graph data 172 to show nodes and edges providing a graphical display of the subsequent transforms. Updating the provenance graph 300 in this manner may include translating the existing graph laterally to the left and displaying new nodes and edges to the right of node 314 to illustrate the transforms or relationships that are arranged later in the pipeline.

Embodiments have been described that are useful to determine, when viewing a particular table or column at an arbitrary point in time, how errors have arisen or what effects could occur if transformations are changed. Embodiments can be used to track backwards through time the joins, selections or other transformations that caused a particular column to exist or achieve a specified state, including to trace the datasets or operations that have contributed to creating a particular column of a particular table in a complex pipeline and/or to determine what data transformation is responsible for creating, deleting or updating a particular column of a particular dataset. Embodiments also are useful, to provide a self-documenting description of what a column means. To address the problem that columns usually only have the column name as a description, which is insufficient, and manual commenting is prone to falling out of date, embodiments provide an automatic way to generate a description of what that data represents through the transformations.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
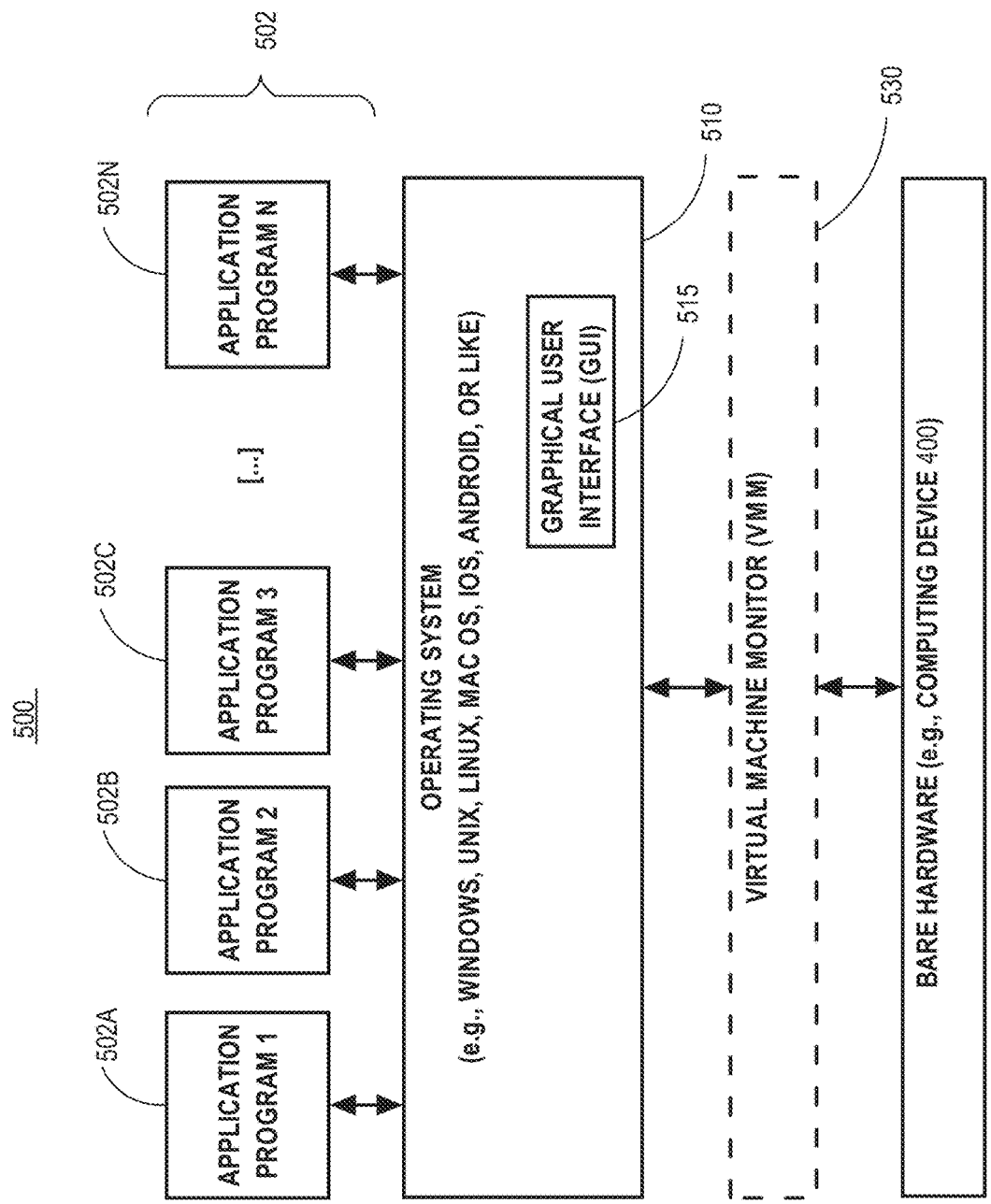
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of determining and displaying metadata that represents provenance of columns in a data store, comprising:
receiving query data expressed in a human-readable language and describing one or more transformations of data tables of a distributed database system or columns of the data tables;
parsing the query data to create a data structure for unresolved transforms in which the data tables are not matched with the columns;
based in part upon table schema metadata describing the columns of the data tables, creating an additional data structure for resolved transforms,
the additional data structure matching the data tables with the columns and specifying inputs and outputs of each transformation of the one or more transformations;
based on information in the additional data structure, creating and causing display of a visual graph of the columns of the data tables and relationships between the columns, relating to the one or more transformations,
wherein the method is performed by one or more processors.

2. The method of claim 1,
the query data indicating one or more operators;
the data structure indicating attributes of the one or more operators.

3. The method of claim 2, the additional data structure referring to a temporary output data table for an operator of the one or more operators.

4. The method of claim 1, creating the additional data structure comprising making a call to a distribute database system to retrieve a table schema.

5. The method of claim 1, further comprising creating metadata for the resolved transforms that include links to code segments in the human-readable language corresponding to the one or more transformations and creating a build job specification.

6. The method of claim 5, further comprising causing concurrent display of code snippets from the code segments.

7. The method of claim 6, further comprising executing a build job that effects the one or more data transforms using the build job specification.

8. The method of claim 1, the visual graph being a provenance graph including one or more nodes representing one or more columns of the columns and one or more edges representing one or more column relationships of the relationships.

9. The method of claim 8, the provenance graph further including a node representing a join operation and edges connecting a node of the one or more nodes representing the one or more columns to the node representing the join operation.

10. The method of claim 1, further comprising:
receiving a selection of a specific data table of the data tables;
causing display of forward and backward relationships of the specific data table to other data tables.

11. A system for determining and displaying metadata that represents provenance of columns in a data store, comprising:
a memory;
one or more processors coupled to the memory and configured to perform:
receiving query data expressed in a human-readable language and describing one or more transformations of data tables of a distributed database system or columns of the data tables;
parsing the query data to create a data structure for unresolved transforms in which the data tables are not matched with the columns;
based in part upon table schema metadata describing the columns of the data tables, creating an additional data structure for resolved transforms,
the additional data structure matching the data tables with the columns and specifying inputs and outputs of each transformation of the one or more transformations;
based on information in the additional data structure, creating and causing display of a visual graph of the columns of the data tables and relationships between the columns, relating to the one or more transformations.

12. The system of claim 11,
the query data indicating one or more operators;
the data structure indicating attributes of the one or more operators.

13. The system of claim 12, the additional data structure referring to a temporary output data table for an operator of the one or more operators.

14. The system of claim 11, creating the additional data structure comprising making a call to a distribute database system to retrieve a table schema.

15. The system of claim 11, the one or more processors configured to further perform creating metadata for the resolved transforms that include links to code segments in the human-readable language corresponding to the one or more transformations and creating a build job specification.

16. The system of claim 15, the one or more processors configured to further perform causing concurrent display of code snippets from the code segments.

17. The system of claim 16, the one or more processors configured to further perform executing a build job that effects the one or more data transforms using the build job specification.

18. The system of claim 11, the visual graph being a provenance graph including one or more nodes representing one or more columns of the columns and one or more edges representing one or more column relationships of the relationships.

19. The system of claim 18, the provenance graph further including a node representing a join operation and edges connecting a node of the one or more nodes representing the one or more columns to the node representing the join operation.

20. The system of claim 11, the one or more processors configured to further perform:
receiving a selection of a specific data table of the data tables;
causing display of forward and backward relationships of the specific data table to other data tables.

* * * * *